United States Patent [19]

Grasselli

[11] Patent Number: 5,211,097
[45] Date of Patent: May 18, 1993

[54] BLADE-HOLDING DEVICE

[76] Inventor: Giorgio Grasselli, Via a, Varisco 1, 42020 Albinea Reggio Emilia, Italy

[21] Appl. No.: 793,575

[22] Filed: Nov. 18, 1991

Related U.S. Application Data

[63] Continuation-in-part of Ser. No. 637,159, Jan. 3, 1991, abandoned.

[30] Foreign Application Priority Data

Jan. 16, 1990 [IT]  Italy ............... 46804 A/90

[51] Int. Cl.⁵ ............................................. B26D 7/02
[52] U.S. Cl. .................................. 83/698; 83/700; 83/856; 452/127
[58] Field of Search ............... 83/698, 699, 700, 856, 83/915.5; 452/127, 128; 99/584, 589

[56] References Cited

U.S. PATENT DOCUMENTS

| 1,703,217 | 2/1929 | Watson | 452/127 |
| 2,578,952 | 12/1951 | Townsend | 452/127 X |
| 3,542,105 | 11/1970 | Townsend | 452/127 |
| 3,699,830 | 10/1972 | Pickett | 83/915.5 X |
| 4,327,633 | 5/1982 | Leining et al. | 452/127 |
| 4,466,344 | 8/1984 | Schill | 452/127 |
| 4,606,093 | 8/1986 | Townsend | 452/127 |
| 4,793,026 | 12/1988 | Braeger et al. | 452/127 |

FOREIGN PATENT DOCUMENTS 1243344  6/1967  Fed. Rep. of Germany ........ 83/698

Primary Examiner—Mark Rosenbaum
Assistant Examiner—Peter Dungba Vo
Attorney, Agent, or Firm—James J. Ralabate

[57] ABSTRACT

This invention involves a novel blade holder for use in food-processing machines particularly skinning machines. This blade holder has as two major elements a top and a bottom piece having at their front terminal portions a place where the blade is clamped. In the center section of each piece are a number of connecting screws or bolts which not only connect the top and bottom pieces but also act as a fulcrum. Thus, when the rear sections of the top and bottom pieces are forced apart by a lever action, their front terminal portions move tightly together to form a firm grip or clamp effect on the blade. To remove the blade, the rear sections are brought closer together thus releasing the tight clamp in the front terminal portions and thus releasing the blade.

11 Claims, 2 Drawing Sheets

BLADE-HOLDING DEVICE

This invention relates to a blade-holding device and, more particularly, to a novel blade-holding device adapted to be easily manipulated to change the blade. This application is a continuation-in-part of parent application Ser. No. 07/637,159 filed in the U.S. Patent and Trademark Office on Jan. 3, 1991, now abandoned.

BACKGROUND OF THE INVENTION

It is known to use various structures to hold blades including machines used in the food-processing and food-connected industries. In meat-skinning machines several structures have been disclosed in the art and patented. Typical machines known in the art are described in U.S. Pat. Nos. 1,703,217; 3,542,105; 4,466,344 and 4,606,093.

In U.S. Pat. No. 1,703,217 issued to Watson, a meat-skinning machine is disclosed having means for stretching out the wrinkles from meat slabs before feeding them to the skinning machine. The improvement in Watson resides in improved feeding means whereby the slabs of meat are pushed against the cutting edge of the skinning knife as distinguished from former machines where the slabs of meat were pulled against the knife by fingers which engage the edges of the skin of the meat slabs. The skinning knife of Watson's device is in the form of an endless band 45 positioned so that its cutting edge 48 extends outwardly of roller 25. The knife or blade 45 of Watson is secured by set screws 80 and 81 threaded in plates 67 and 68. The endless band blade 45 of Watson is extended around wheels 46 and 47 and travels therearound. There is no specific teachings in Watson of clamping means to secure a cutting blade in position nor means to change and clean said blade.

In U.S. Pat. No. 3,542,105 Townsend, a method of skinning meat is disclosed using a skinning machine that controls the relative concentric positions of the gripping roll and the pressure shoe 70 on which the blade 76 is mounted. Adjusting screws 78 are provided in shoe 70 for adjusting the position of the skinning blade 76; see FIG. 9 of Townsend. It is assumed that adjusting screws 78 when loosened would permit the blade 78 to be removed, however Townsend is silent on this feature.

In Townsend II, U.S. Pat. No. 4,606,093 a meat-skinning machine is disclosed. A feature of Townsend II is to provide improved means for moving an adjustable knife or blade between a plurality of different positions. The blade control assembly 18 of Townsend II comprises a blade 24 which is held by an upper blade holder 26 and a lower blade holder 28 which are held together by means of a screw 30. To remove the blade Townsend II's device would require the user to unscrew or remove machine screw 30, separate parts 26 and 28 and thereby remove or replace the blade. This screw removal means used and taught by Townsend II is conventionally used now in many prior art devices. A simple, more efficient structure for holding and removing blades from this type structure would provide a significant advance in the art.

In Schill, U.S. Pat. No. 4,466,344 a bacon-skinning machine is disclosed wherein the blade or knife is movable by a support having two arms which carry the knife holder. The arms are movable lengthwise and are pivotable by two eccentrics mounted on a shaft which is rotatable by a single lever. The lever can move the support to a position in which the holder and the knife can be detached from the arms. The blade 5 of Schill is held in a holder 4 and means are provided for yieldably biasing the holder 4 and the knife 5 toward a traction wheel 3. This prior art patent is specific on means for adjusting the location of blade 5 and does not detail means for removing or holding the blade in position. It is assumed that conventional means are used in holder 4 of Schill to hold blade 5 in position. Again, a simple, efficient means to remove or insert a blade would be highly desirable.

Thus, the prior art does not teach a blade-holding device where the blade can be removed and replaced (or cleaned) by simple exterior means. Unscrewing bolts or screws or other known removal or loosening means requires time-consuming and sometimes complex and confusing ways of removing blades from its holder. Even in the most efficient blade holders, it generally requires a relatively complicated maneuver to separate the two blade-holding members by unscrewing and subsequently screwing a plurality of holding screws or bolts.

SUMMARY OF THE INVENTION

It is therefore an object of this invention to provide a blade-holding mechanism devoid of the above-noted disadvantages.

Another object of this invention is to provide a blade holder in which the separation and refixing of the blade-holding members is simple and yet effective.

Another object of the invention is to provide a blade-holding member where exterior manipulation and removal of the blade is relatively simple.

Still another object of this invention is to provide a two-piece blade holder that firmly holds the blade in position yet is easily separated to remove the blade.

Another still further object of the invention is to provide a blade holder especially suited for a skinning machine that provides a mechanism for easily cleaning or replacing blades after prolonged use.

These and other objects of this invention are accomplished by providing a blade holder comprising a two-piece clamping member (top and bottom pieces) between which a blade is positioned and extends outwardly therefrom at its front section. A critical feature of this invention is that these top and bottom pieces can be separated easily by merely sliding the top piece upon the bottom piece and disengaging it therefrom. That is, the top piece has a series of circular openings on its upper surface into which a connecting means is downwardly projected. This connecting means (or coupling element) is fixed at its lower terminal portion in the bottom piece and has its upper terminal portion extending through the upper piece. The connecting means is located at the center portion of the top and bottom pieces. This connecting means has the shape of a bolt or screw with a wider head and a narrower tapered lower portion. The wider circular head or top portion has a diameter slightly smaller than the diameter of the circular openings in the top piece. To lock the top piece to the bottom piece, the top piece is slid or moved horizontally until the circumference or outer part of the circular opening locks underneath the head of the coupling element or connecting means. A series of these connecting means extends upwardly from the bottom piece of the clamping member and extends through the apertures or circular openings of the top piece. To unlock the top and bottom pieces, one merely slides the top piece to a position where the head of the connecting means clears the circular openings and the top piece can be lifted free. The blade can then be removed, cleaned and/or replaced, the top piece placed over the bottom piece so that the apertures are aligned with the connecting means and subsequently moving the top piece horizontally until the top piece locks under the head of the connecting means (or coupling means).

Another critical feature of this invention is the cam means located at the back section (front section holds the blade) of the blade holder. This cam means is positioned between the inner surfaces (facing each other) of the top and bottom pieces forcing them apart at that end. This cam thereby forces the top and bottom pieces apart at the back section and by the lever action provided by the fulcrum of the centralized connecting means forces the front sections of the top and bottom pieces toward each other. This action tightens the clamping action at the front sections around the blade held therebetween. This is an extremely important aspect of the present invention. To accomplish this lever-like feature there is provided a cavity cut away from the inner surface of the rear section of the top piece. This cavity extends through substantially the width of the top piece or member (second member). A cylindrical cam means is fitted into this cavity in a substantially exact fit and contacts the inner surface of the cavity and the facing surface of the bottom piece or first member. This cam means comprises a cylindrical bar or rod of circular cross-section provided with a flat face which also extends through the length of the bar. The bar is disposed between the first and second piece with its axis parallel to the cutting edge of the blade. The cavity has a rectangular cross-section and a depth less than the maximum diameter of the bar or rod. The cavity can be provided in either the bottom piece or member (first member) or top member or piece (second member). Suitable means are provided for rotating the bar or rod to positions where it urges the top and bottom members apart and to positions where it relaxes the separating force thereby bringing the top and bottom members toward each other in their rear portions and by the lever action also releasing the pressure holding the blade in their front portions. The blade thereby can easily be removed and cleaned or replaced. Once replaced the rod or bar is rotated to a position urging the top and bottom members apart in their rear section thereby clamping the blade tightly in their front sections. This important feature will be further described in reference to the drawings.

DESCRIPTION OF THE DRAWING AND PREFERRED EMBODIMENTS

Figure 1:
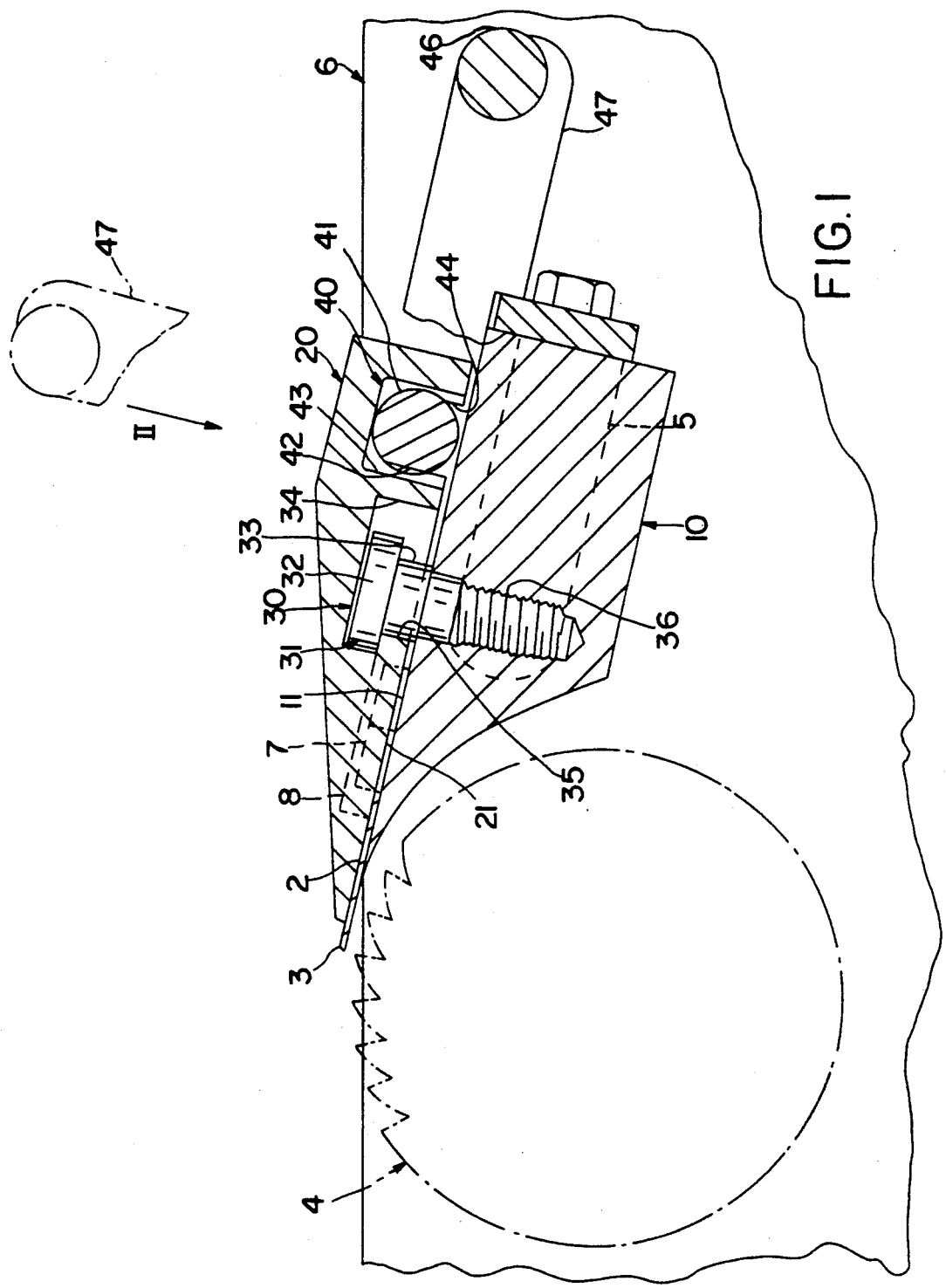
FIG. 1 is a side cutaway view taken along the line 1—1 of FIG. 2.

In FIG. 1 the device comprises a bottom or first member 10 and a top or second member 20. The first member 10 comprises an inner surface 11 the front portion of which is flat and arranged to make contact with one of the two major faces of the blade 2.

The second member 20 comprises, facing the inner surface 11, an inner surface 21, the front portion of which is flat and is arranged to make contact with the other major face of the blade 2 and also to clamp the body of the blade 2 in cooperation with the front portion of the surface 11.

Means 30 are provided to retain the two members 10 and 20 together to prevent the two facing surfaces 11 and 21 moving apart in a direction perpendicular to said surfaces. The means 30 are provided in the middle or intermediate region of the surfaces 11 and 21 and are inserted and withdrawn by aligning means 30 with holes 34 by moving the two members 10 and 20 relative to each other in a direction parallel to the facing surfaces 11 and 21.

Finally, cam means 40 are provided to exert a thrust tending to move the facing surfaces 11 and 21 apart in a direction perpendicular to said surfaces. The means 40 are provided in the rear region of the surfaces 11 and 21, i.e. on the other side of means 30 to the side opposite to which the blade 2 is clamped.

The two members 10 and 20 act substantially as two levers pivoted together by the means 30. The thrust is provided by the means 40 which by moving the rear regions of the members 10 and 20 apart cause the front regions to move together and thus clamp the blade 2. When the cam means 40 are not acting, the means 30 can be withdrawn and reinserted by aligning and moving the members 10 and 20 parallel to the surfaces 11 and 21.

The retention means 30 comprise one or more coupling elements 31 projecting from the surface 11 or 21 of a member 10 or 20 and are fixed to this member. In the figures the elements 31 are fixed to the member 10. Each element 31 comprises a final portion 32 (i.e. located at its free end) which projects laterally to an initial portion 33 (i.e. located at the surface 11 or 21 to which the element 31 is fixed) to form an angle therewith. In that surface 11 or 21 of the member 10 or 20 opposite that to which the elements 31 are fixed there are provided one or more cavities 34 in positions corresponding with the elements 31. In the figures the cavities 34 are provided in the center portion of the surface 21. Each cavity 34 is arranged to receive and contain a respective coupling element 31 and also defines in the member 10 or 20 in which it is provided an undercut element 35 which can be inserted substantially as an exact fit into said angle formed by the portions 32 and 33.

Figure 2:
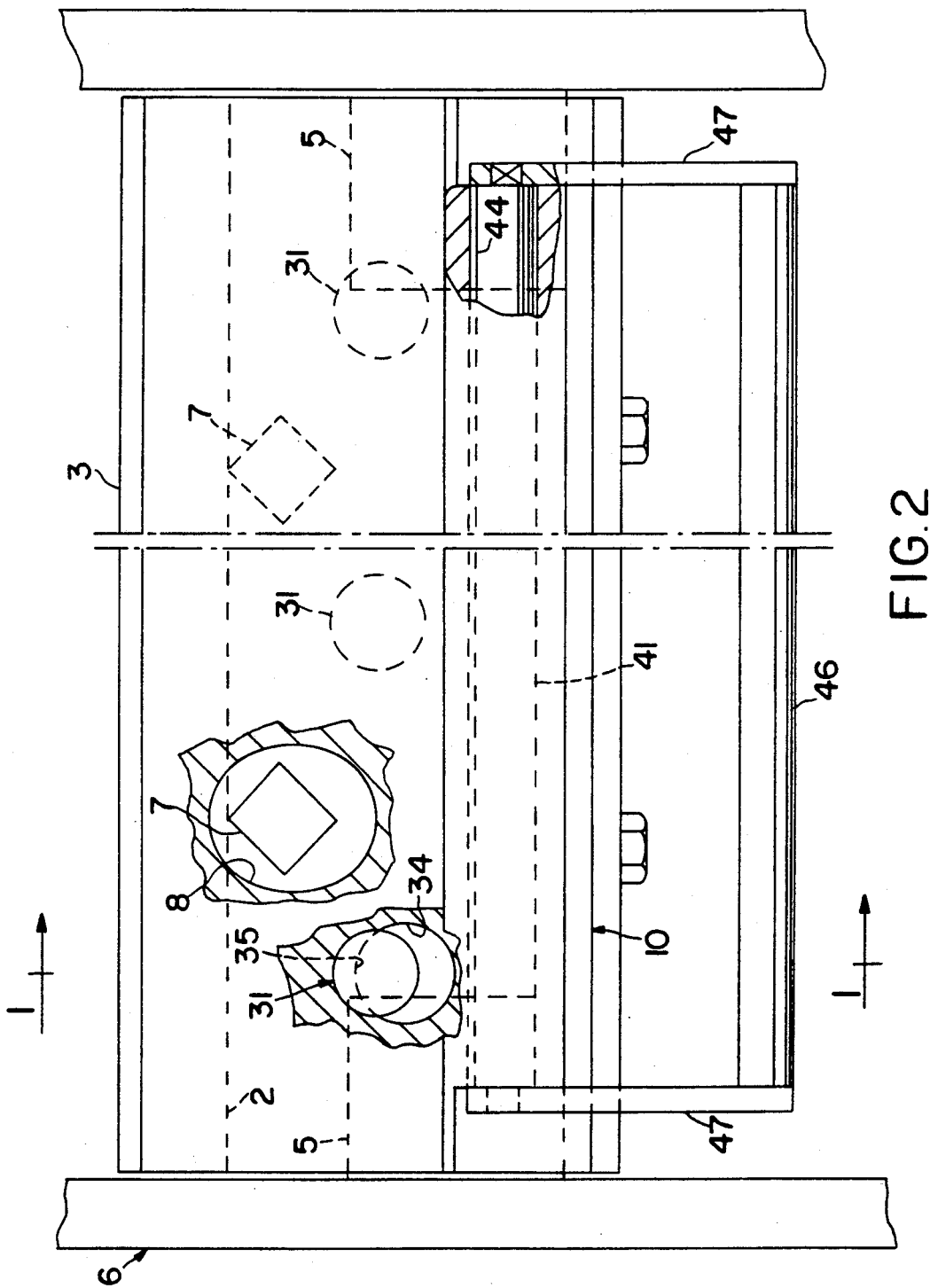
FIG. 2 is a top plan view of the device of this invention.

In the illustrated embodiment each element 31 comprises a shank 36 screwed into a corresponding hole in the member 10 and having above it a cylindrical portion 33, itself having above it cylindrical portion 32 having a larger diameter than the portion 33. The cavity 34 comprises a cylindrical main region having a diameter slightly larger than the diameter of the portion 32 and a height slightly greater than the height of the entire element 31. In FIG. 2 element or head 31 is shown in a non-aligned position relative to opening 34 and thereby in a locked mode or position. When head 31 is substantially aligned with opening 34 top piece 10 can be disengaged or separated from bottom piece 20. This region is therefore able to receive and contain the entire element 31 when this is inserted through surfaces 11 and 21. The cavity 34 also comprises a further region which defines said undercut element 35 and is able to receive the portion 32 as an exact fit.

The cam means 40 comprise a cylindrical bar 41 of circular cross-section provided with a flat face 42 extending along the entire length of the bar. The bar 41 is disposed between the surfaces 11 and 21 with its axis parallel to the cutting edge 3 of the blade 2.

The bar 41 is contained as an exact fit in a cavity 43 provided in the surface 21 of the body 20 and having its aperture 44 extending along the entire length of the cavity and cut out from the surface 21. The cavity 43 has a rectangular cross-section and a depth less than the maximum diameter of the bar 41. The cavity 43 can be provided in either one of the members 10 and 20. Suitable means are also provided for rotating the bar 41 between a first position in which a bar portion of arched cross-section projects from the aperture 44 (as shown in FIG. 1) and a second position in which the flat face 42 conforms to a surface of cavity or aperture 44 to fit loosely therein. When the bar 41 is in the first position, its arched portion which projects from the aperture 44 pushes against the opposing surface 21 and hence urges the rear regions of the surfaces 11 and 21 vertically apart. The thrust is such that by the pivoting action provided by the retention means 30, the front regions of the surfaces 11 and 21 tend to move together to clamp the blade 2 with sufficient force. In contrast, when the bar 41 is in said second position, there is sufficient clearance between the rear portions and front portions of the surfaces 11 and 21 to allow the two members 10 and 20 to be freely moved relative to each other in a direction parallel to the surfaces themselves.

To retain the bar 41 in the cavity 43 this comprises at its ends two constrictions which surround the bar 41 through an arc greater than 180 degrees while leaving the aperture 44 free. To rotate the bar 41 a handgrip 46 is provided parallel to the bar 41 and is fixed rigidly thereto by two levers 47.

The device shown in the figures is typically suitable for skinning machines. Consequently, the lower member 40 has a concave front region with an arched profile so that the blade can be brought close to a toothed roller 4 of known type which drives the meat pieces to be worked against the blade 2. The member 10 also comprises two lateral recesses into which suitable elements 5 are fitted to secure the member 10 to the machine structure 6. Appropriate elements 7 are also provided inserted into the member 10, their head projecting from the surface 11. The purpose of the elements 7 is to define the rear contact line for correctly positioning the blade 2 on the surface 11 and are contained in corresponding cavities 8 provided in the surface 21.

In the illustrated embodiment, to separate the two members 10 and 20 the handgrip 46 is raised into its upper position (shown by dashed lines in FIG. 1) so that the flat face 42 of cylindrical bar 41 faces the surface 11. Thus, although the members 10 and 20 are coupled together by the elements 31, there is no clamping action on the blade and a certain clearance exists between the surfaces 11 and 21. The member 20 can therefore be moved slightly forward relative to the body 10 to release the portions 32 from the elements 35 and release the clamping action. The member 20 can now be raised and removed to release the blade 2 which now only rests on the member 10.

To assemble the device the reverse procedure is used. The blade 2 is firstly placed on the surface 11 against the elements 7. The member 20 is then rested on the member 10 with a movement perpendicular to the surfaces 11 and 21 and causing the elements 31 to enter the cavities 34. The member 20 is then moved slightly backwards to insert the portions 32 so that they rest on elements 35. Finally, the handgrip 46 is lowered by rotating it through about 90 degrees (as shown by the continuous line in FIG. 1). This rotation causes an arched portion of the profile of the bar 41 to project from the surface 21 and against the surface 11, to pull the rear portions of the two surfaces 11 and 21 apart to such an extent as to create a sufficient clamping action on the blade 2.

With the device of the invention the separation and reassembly of the two members 10 and 20 are extremely rapid and simple operations. No tools such as screwdrivers, wrenches, ratchets or others are needed to change the blades in the device of this invention. In addition, the means 30 and 40 are housed in cavities open only in the surfaces 11 and 21 and consequently the external surfaces of the entire device can be substantially continuous and smooth, so facilitating surface cleaning and hygiene.

The method for changing blades of the skinning machine in this invention involves providing a first member (10) which is arranged to contact a surface of said blade. A second member (20) is also provided having a surface (21) facing a surface of first member (10). The surface (21) is arranged so that it faces another face of said blade. Means are provided to movably retain members (10) and (20) together while moving said members (10) and (20) independently of and relative to each other in a direction parallel to the facing surfaces (11) and (21). Finally, the blade is removed from the skinning machine and from contact with surfaces (11) and (21). As noted earlier, the blades can be changed without the need for or use of other tools.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A blade holder comprising in combination a top piece, a bottom piece, at least one connecting means to connect the top and bottom pieces and a cylindrical cam means, said top piece being movable and having an inner surface which abuts an inner surface of said bottom piece, the inner surfaces of said top piece and said bottom piece forming thereby a clamping means to hold a blade therebetween, at least one cavity or openings provided in said inner surface of said top piece having an open portion abutting said inner surface of said bottom piece, said connecting means fixed to and extending upwardly from said inner surface of said bottom piece, said connecting means fitting through and locked within said openings of said top piece when in a locked position, and when said connecting means are disengaged from said openings said top piece is removable from its connecting mode with said bottom piece, said top and bottom pieces having said clamping means at their front portion to hold a blade therebetween, the inner surfaces of said top and bottom pieces in contact with tightening cam means at their rear sections to move said top and bottom pieces together at their front portions to thereby tightly hold said blade therebetween, said connecting means providing a fulcrum upon which said top piece and said bottom piece will move to form a clamping means in their front section, said cam means comprising a substantially cylindrical rod with a flat portion or face on its circumference which extends throughout the length of said rod, said rod fitted in between the rear sections of the inner surfaces of said top and bottom pieces, said rod being rotatable therein to force said top and bottom pieces apart and to bring them toward each other.

2. The blade holder of claim 1 wherein said openings are larger than the corresponding dimension of said connecting means to provide thereby means for said connecting means to be inserted and withdrawn from said openings.

3. The blade holder of claim 1 wherein said connecting means are positioned at substantially an intermediate section of said top and bottom pieces to form thereby a fulcrum that together with said tightening cam means causes a lever action to tightly hold or release a blade from said clamping means.

4. The blade holder of claim 1 wherein said connecting means are in the form of a screw having a top head portion, said head portion having a diameter slightly smaller than the diameter of said openings to thereby be fitted into or removed therefrom, a stem portion of said connecting means being fixed into said bottom piece and extending upwardly therefrom through openings in said top piece, when said head portion is substantially aligned with said openings said top piece is no longer locked to said bottom piece and is removable therefrom.

5. The blade holder of claim 1 wherein said top piece is removable from said bottom piece by moving said top piece so as to align said connecting means with said openings so that said connecting means are cleared from said openings.

6. The blade holder of claim 1 wherein said cam means are able to exert a thrust tending to move said inner surfaces apart in a direction perpendicular to said inner surfaces, said cam means being provided in the rear sections of said inner surfaces, said cam means connected to means exterior to said blade holder for rotating said cam means.

7. The blade holder of claim 1 wherein said cavity or openings contain an undercut element which receives and locks with a head on said connecting means when said locking means and said openings are not substantially aligned, thereby locking said top and bottom pieces together.

8. A blade holder comprising in combination a top piece, a bottom piece, connecting means to connect said top piece to said bottom piece, and a cylindrical cam means, said top piece having an inner surface abutting an inner surface of said bottom piece, said top piece having in its inner surface at least one cavity or openings with open portions abutting said inner surface of said bottom piece, said openings located substantially midway along a width of said top piece, said top piece having at its rear section at its inner surface a cutaway portion defining a cam housing, a substantially cylindrical rod positioned in said cam housing and adapted to contact both said inner surface of said bottom piece and an inner portion of said cam housing, said connecting means fixed to and extending upwardly from said inner surface of said bottom piece, said connecting means having a stem and wider head portion, said connecting means located in said bottom piece at positions substantially adjacent said openings in said top piece, said connecting means providing a fulcrum upon which said top piece and said bottom piece will move to form a clamping means in their front section, said tightening cam means comprising said substantially cylindrical rod with a flat portion on its circumferential portion which extends throughout the length of said rod, said rod fitted in between the rear sections of the inner surfaces of said top and bottom pieces, said rod being rotatable therein to force said top and bottom pieces apart and to bring them toward each other.

9. The blade holder of claim 8 wherein said openings are larger than the corresponding dimension of said connecting means to provide thereby means for said connecting means to be inserted and withdrawn from said openings.

10. The blade holder of claim 8 wherein said connecting means are positioned at substantially an intermediate section of said top and bottom pieces to form thereby a fulcrum that together with said tightening cam means causes a lever action to tightly hold or release a blade from said clamping means.

11. The blade holder of claim 8 wherein said connecting means are in the form of a screw having a top head portion, said heat portion having a diameter slightly smaller than the diameter of said openings to thereby be fitted into or removed therefrom, a stem portion of said connecting means being fixed into said bottom piece and extending upwardly therefrom through openings in said top piece, when said head portion is subsequently aligned with said openings said top piece is no longer locked to said bottom piece and is removable therefrom.

* * * * *